(12) United States Patent
Doi et al.

(10) Patent No.: US 8,823,914 B2
(45) Date of Patent: Sep. 2, 2014

(54) LIQUID CRYSTAL DISPLAY APPARATUS

(75) Inventors: Takashi Doi, Kanazawa (JP); Toshihiro Ninomiya, Nonoichi (JP); Tetsuyuki Yamada, Tokyo (JP); Tetsuya Yamade, Kanazawa (JP)

(73) Assignee: Japan Display Inc., Tokyo (JP)

( * ) Notice: Subject to any disclaimer, the term of this patent is extended or adjusted under 35 U.S.C. 154(b) by 152 days.

(21) Appl. No.: 13/525,624

(22) Filed: Jun. 18, 2012

(65) Prior Publication Data

US 2012/0320324 A1    Dec. 20, 2012

(30) Foreign Application Priority Data

Jun. 20, 2011 (JP) ................... 2011-136436

(51) Int. Cl.
*G02F 1/1333* (2006.01)
*G06F 3/044* (2006.01)

(52) U.S. Cl.
CPC ............ *G06F 3/044* (2013.01); *G02F 1/13338* (2013.01); *G02F 2001/133388* (2013.01)
USPC ........................................................ 349/153

(58) Field of Classification Search
USPC .................................................. 349/153, 43
See application file for complete search history.

(56) References Cited

U.S. PATENT DOCUMENTS 6,115,097 A * 9/2000 Yamazaki .................... 349/151
6,489,176 B2 12/2002 Ninomiya
7,859,521 B2 12/2010 Hotelling et al.
7,884,900 B2 2/2011 Doi et al.
2010/0033660 A1 2/2010 Yamada et al.

FOREIGN PATENT DOCUMENTS

| JP | 11-167125 | 6/1999 |
| JP | 2004-205552 | 7/2004 |
| JP | 2008-65096 | 3/2008 |
| JP | 2009-80279 | 4/2009 |
| JP | 2010-231773 | 10/2010 |

OTHER PUBLICATIONS

Japanese Office Action issued Jun. 25, 2013, in Japan Patent Application No. 2011-136436 (with English translation).

* cited by examiner

*Primary Examiner* — James Dudek
(74) *Attorney, Agent, or Firm* — Oblon, Spivak, McClelland, Maier & Neustadt, L.L.P.

(57) ABSTRACT

According to one embodiment, a liquid crystal display apparatus includes a display region including a plurality of display pixels arrayed in a matrix, an array substrate including pixel driving interconnections configured to drive the plurality of display pixels, a planarization film which is arranged on the pixel driving interconnections and includes a thin film portion having a small film thickness at a pattern end, and first electrodes which are arranged on the planarization film to cross the pattern end of the planarization film, a countersubstrate which is arranged to face the array substrate, and a liquid crystal layer which is interposed between the array substrate and the countersubstrate.

22 Claims, 5 Drawing Sheets

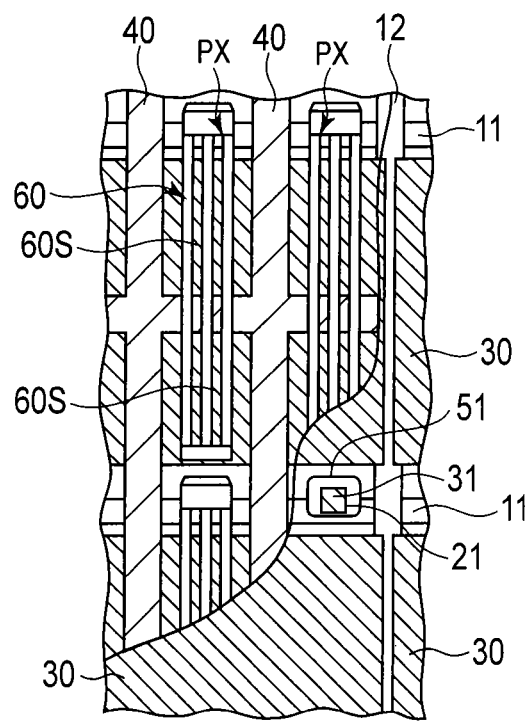
F I G. 5
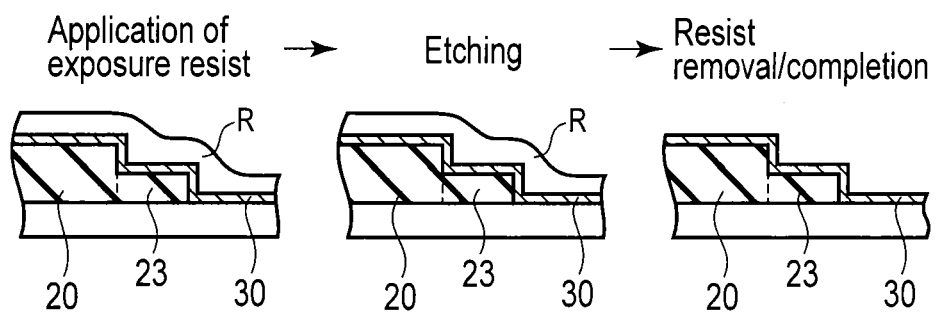
F I G. 6

LIQUID CRYSTAL DISPLAY APPARATUS

CROSS-REFERENCE TO RELATED APPLICATIONS

This application is based upon and claims the benefit of priority from prior Japanese Patent Application No. 2011-136436, filed Jun. 20, 2011, the entire contents of which are incorporated herein by reference.

FIELD

Embodiments described herein relate generally to a liquid crystal display apparatus.

BACKGROUND

Flat display apparatuses are currently undergoing active development, particularly liquid crystal displays, which are finding application in various fields by dint of such desirable features as lightness, thinness, and low energy consumption. A liquid crystal display is realized by confining a liquid crystal layer between paired substrates, the display producing an image as a result of the modulation factor of light passing through the liquid crystal layer being controlled in accordance with an electric field between a pixel electrode and a common electrode.

For liquid crystal display apparatuses, there are known a method of controlling the liquid crystal alignment state by applying, to the liquid crystal layer, a longitudinal electric field in a direction almost perpendicular to the substrate surfaces of the paired substrates, and a method of controlling the liquid crystal alignment state by applying, to the liquid crystal layer, a transverse electric field (including even a fringe electric field) in a direction almost parallel to the surfaces of the paired substrates.

One of paired substrates includes driving interconnections for driving display pixels arrayed in a matrix, switching elements, a transparent organic insulating film (to be referred to as a planarization film hereinafter) arranged on the driving interconnections and pixel switches, and a conductive layer arranged on the planarization film.

A structure using a transverse electric field especially receives attention in terms of a wider view angle. A transverse electric field liquid crystal display apparatus in the in-plane switching (IPS) mode, fringe field switching (FFS) mode, or the like includes pixel electrodes and common electrodes formed on an array substrate. Liquid crystal molecules are switched by a transverse electric field almost parallel to the major surface of the array substrate.

BRIEF DESCRIPTION OF THE DRAWINGS

FIG. 5 is a plan view for explaining an example of the arrangement of display pixels in the liquid crystal display apparatus shown in FIG. 1;

FIG. 6 is a sectional view for explaining an example of a process of forming a conductive layer on a planarization film in the liquid crystal display apparatus according to the embodiment;

DETAILED DESCRIPTION

In general, according to one embodiment, a liquid crystal display apparatus comprises a display region including a plurality of display pixels arrayed in a matrix; an array substrate including pixel driving interconnections configured to drive the plurality of display pixels, a planarization film which is arranged on the pixel driving interconnections and includes a thin film portion having a small film thickness at a pattern end, and first electrodes which are arranged on the planarization film to cross the pattern end of the planarization film; a countersubstrate which is arranged to face the array substrate; and a liquid crystal layer which is interposed between the array substrate and the countersubstrate.

A liquid crystal display apparatus according to an embodiment will now be described with reference to the drawings.

Figure 1:
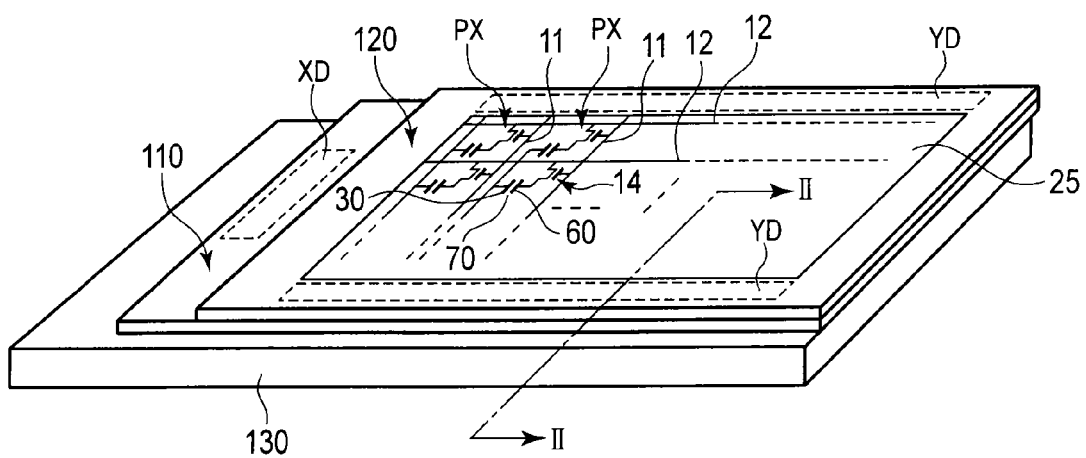
FIG. 1 is a perspective view for explaining an example of the arrangement of a liquid crystal display apparatus according to an embodiment.

FIG. 1 schematically shows an example of the liquid crystal display apparatus according to the embodiment. The liquid crystal display apparatus includes a liquid crystal display panel including an array substrate 110, a countersubstrate 120 which is arranged to face the array substrate 110 at a predetermined interval, a liquid crystal layer 70 (FIG. 2) interposed between the array substrate 110 and the countersubstrate 120, and a display region 25 including display pixels PX arrayed in a matrix, and a backlight unit 130 which illuminates the liquid crystal display panel from the back.

Figure 2:
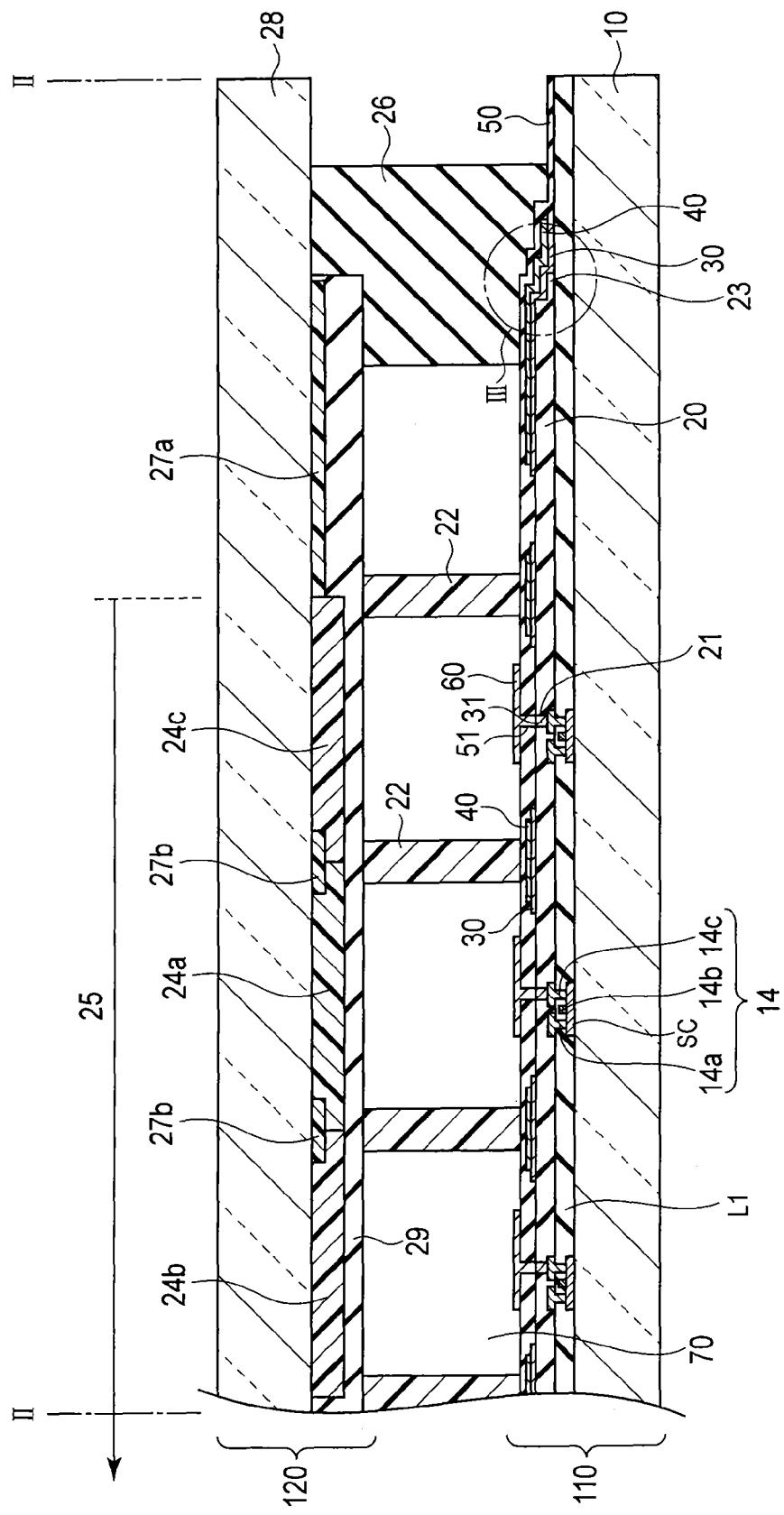
FIG. 2 is a sectional view showing an example of the section of the liquid crystal display apparatus shown in FIG. 1 taken along a line II-II.

FIG. 2 shows an example of the section of the liquid crystal display panel shown in FIG. 1 taken along a line II-II. The liquid crystal display apparatus according to the embodiment is a liquid crystal display apparatus in the FFS mode in which the alignment state of the liquid crystal layer 70 is controlled using a transverse electric field.

The array substrate 110 includes a transparent insulating substrate 10 of glass or the like, pixel driving interconnections arranged on the transparent insulating substrate 10, switching elements 14, insulating films L1 and 50, a planarization film 20, common electrodes (first electrodes) 30, sensor electrodes (second electrodes) 40, pixel electrodes (third electrodes) 60, an alignment film (not shown), and a driving circuit. The pixel driving interconnections include a plurality of scanning lines 11 and a plurality of signal lines 12.

The driving circuit includes scanning line driving circuits YD which are arranged in a frame region around the display region 25 and drive the plurality of scanning lines 11, and a signal line driving circuit XD which drives the plurality of signal lines 12.

The scanning line driving circuits YD are arranged on both sides of the display region 25 in a direction in which the scanning lines 11 run. The plurality of scanning lines 11 running from the display region 25 are electrically connected to the scanning line driving circuits YD. The plurality of signal lines 12 running from the display region 25 are electrically connected to the signal line driving circuit XD.

A flexible board (not shown) is connected to the end of the array substrate 110. A control signal and video signal are supplied from a signal source (not shown) to the scanning line driving circuits YD and signal line driving circuit XD via the flexible board.

The scanning lines 11 run along the rows of the display pixels PX arrayed in a matrix in the display region 25. The signal lines 12 run along the columns of the display pixels PX arrayed in a matrix in the display region 25.

Each switching element 14 is arranged near a position where the scanning line 11 and signal line 12 cross each other. The switching element 14 is arranged on an undercoat layer (not shown) arranged on the transparent insulating substrate 10. The switching element 14 includes a thin-film transistor including an amorphous silicon or polysilicon semiconductor layer SC, gate electrode 14b, source electrode 14a, and drain electrode 14c.

A gate insulating film is arranged on the semiconductor layer SC of the switching element 14. The gate electrode 14b of the switching element 14 is arranged on the gate insulating film. The source electrode 14a and drain electrode 14c of the switching element 14 are connected to the semiconductor layer SC in a contact hole formed in the insulating film L1.

The gate electrode 14b of the switching element 14 is electrically connected to (or formed integrally with) the corresponding scanning line 11. The source electrode 14a of the switching element 14 is electrically connected to (or formed integrally with) the corresponding signal line 12. The drain electrode 14c of the switching element is electrically connected to the corresponding pixel electrode 60 in contact holes 21 and 51 (described later).

The scanning line driving circuit YD drives the scanning line 11 to apply a voltage to the gate electrode 14b of the switching element 14. Then, the source electrode 14a and drain electrode 14c are rendered conductive to turn on the switching element 14 for a predetermined period. While the switching element 14 is on, a video signal is supplied from the signal line 12 to the pixel electrode 60 via the switching element 14.

The planarization film 20 is arranged on the switching element 14. In the embodiment, the planarization film 20 is a transparent organic insulating film, and the film thickness T1 (FIG. 4) of the planarization film 20 is about 3 μm. The planarization film 20 is arranged in the entire display region 25 except for the contact holes 21. The planarization film 20 includes a second planarization film 20' (FIG. 7) arranged near a position where it faces a cut portion 120C of the countersubstrate 120. The contact hole 21 is formed in the planarization film 20 on the drain electrode 14c of the switching element 14 to electrically connect the pixel electrode 60 (described later). The planarization film 20 also includes a thin film portion 23 at the pattern end.

Figure 3:
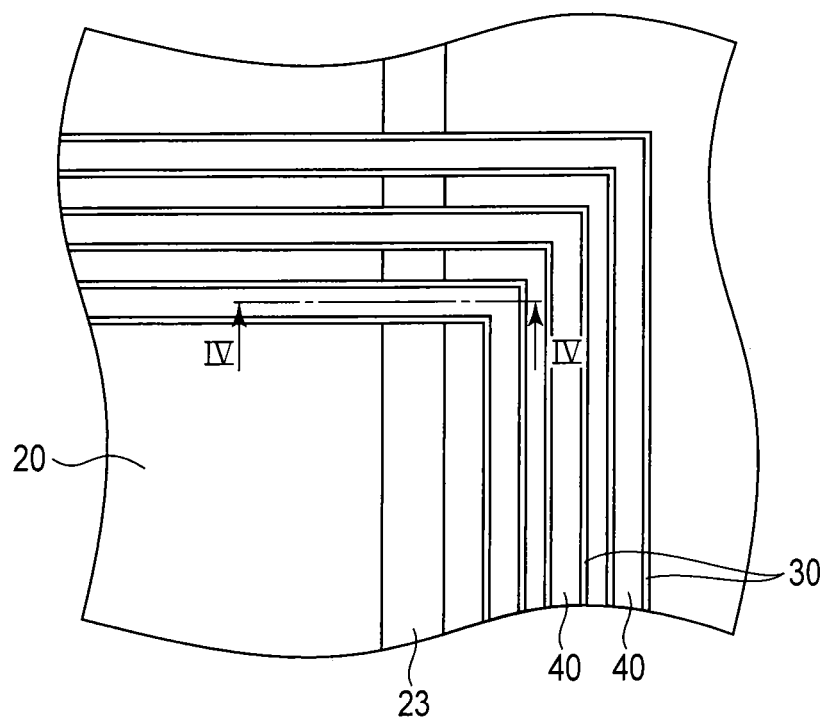
FIG. 3 is an enlarged plan view showing part of an array substrate surrounded by a line III in the liquid crystal display panel shown in FIG. 2.

FIG. 3 is a view for explaining an example of an arrangement at a pattern end surrounded by the line III in the planarization film 20 of the liquid crystal display panel shown in FIG. 2.

Figure 4:
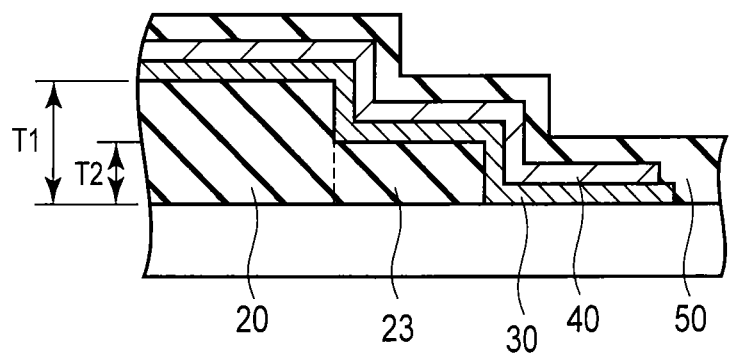
FIG. 4 is a sectional view for explaining an example of the section of part of the array substrate shown in FIG. 3 taken along a line IV-IV.

FIG. 4 shows an example of a section taken along a line IV-IV in FIG. 3. The thin film portion 23 is formed at the pattern end of the planarization film 20. The film thickness T2 of the thin film portion 23 is smaller than the film thickness T1 of the planarization film 20. In the embodiment, the film thickness T1 of the planarization film 20 is approximately 3 μm, and the film thickness T2 of the thin film portion 23 is approximately 1.5 μm. The thin film portion 23 is arranged in the frame region to surround the display region 25.

FIG. 5 shows an example of the arrangement of the display region 25 of the array substrate 110. In FIG. 5, the pixel electrodes 60 and sensor electrodes 40 are partially omitted to represent the shape of the common electrodes 30.

The common electrodes 30 are arranged on the planarization film 20. The common electrode 30 is a conductive oxide film, and is consisting of a transparent electrode material such as Indium tin oxide (ITO) or indium zinc oxide (IZO). The common electrodes 30 are arrayed in a matrix in the display region 25. Each of the plurality of common electrodes 30 arrayed in a matrix is arranged over the plurality of display pixels PX, and faces the plurality of pixel electrodes 60. The common electrodes 30 are formed using the same pattern by taking account of the overlay accuracy with the sensor electrodes 40 (described later).

The common electrodes 30 arranged at the end of the display region 25 extend to the frame region across the pattern end of the planarization film 20, and receive a common voltage from, e.g., an external signal source via the flexible board.

A connection electrode 31 made of the same material as that of the common electrode 30 is arranged in each contact hole 21. The drain electrode 14c of the switching element 14 and the connection electrode 31 are electrically connected in the contact hole 21.

The sensor electrodes 40 are arranged on the common electrodes 30. The sensor electrode 40 is, for example, a multilayered electrode of aluminum and molybdenum. The sensor electrodes 40 are arrayed in a matrix, including electrodes extending almost parallel to a direction in which the scanning lines 11 run, and electrodes extending almost parallel to a direction in which the signal lines 12 run. The sensor electrodes 40 electrically connect the plurality of common electrodes 30. The sensor electrode 40 is desirably arranged at a flat portion free from a step on the common electrode 30 in the display region 25.

As shown in FIG. 3, the sensor electrodes 40 extend to the frame region across the pattern end of the planarization film 20. The sensor electrodes 40 are electrically connected to, e.g., an external sensor circuit (not shown).

When detecting a touch position on the liquid crystal display apparatus according to the embodiment, the sensor circuit supplies a signal of a predetermined waveform to the sensor electrode 40. The magnitude of a capacitance generated between the user's fingertip or a stylus tip and the sensor electrode 40 changes depending on the distance between the fingertip or the like and the sensor electrode 40. The sensor circuit detects, from the output waveform of a signal output from the sensor electrode 40, a change in the potential of the sensor electrode 40 upon the change in capacitance between the fingertip or the like and the sensor electrode 40, thereby detecting a coordinate position of the sensor electrode 40 that corresponds to the position touched with the fingertip of the user, stylus tip, or the like.

The insulating film 50 is arranged on the sensor electrodes 40. The insulating film 50 is, e.g., an inorganic insulating film, and includes the contact holes 51 each for electrically connecting the pixel electrode 60 and connection electrode 31.

The pixel electrodes 60 are arranged on the insulating film 50, and electrically connected to the connection electrodes 31 in the contact holes 51. The pixel electrode 60 is a conductive oxide film, and is consisting of a transparent electrode material such as ITO or IZO. The alignment film (not shown) is arranged on the pixel electrodes 60.

The pixel electrode 60 includes slits 60S extending almost parallel to each other. In the embodiment, the plurality of slits 60S extend almost parallel to a direction in which the signal lines 12 run.

The alignment state of the liquid crystal layer 70 is controlled by an electric field generated between the pixel electrode 60 and the common electrode 30. By forming the slits 60S in the pixel electrode 60, an electric field is generated between the pixel electrode 60 and the common electrode 30 even at the center of the display pixel PX, and the alignment state of the liquid crystal layer 70 can be controlled.

The countersubstrate 120 includes a transparent insulating substrate 28 of glass or the like, a transparent resin planarization film 29, a plurality of colored layers, and an alignment film (not shown).

The plurality of colored layers are organic insulating films, and include a first colored layer 24a, second colored layer 24b, and third colored layer 24c each of which is colored with a resist of one of red (R), green (G), and blue (B), and a fourth colored layer 27a and fifth colored layers 27b in black. The fourth colored layer 27a is arranged around the display region 25. The fifth colored layers 27b are arrayed in a matrix at positions where they face the scanning lines 11 and signal lines 12 of the array substrate 110.

The array substrate 110 and countersubstrate 120 are arranged so that their alignment films face each other, and are fixed by a sealing agent 26. Columnar spacers 22 are interposed between the array substrate 110 and the countersubstrate 120. The columnar spacers 22 keep constant the distance between the array substrate 110 and the countersubstrate 120. In the embodiment, the height of the columnar spacer 22 is arbitrarily controlled to fall within a range of 2 μm to 6 μm.

The sealing agent 26 is applied around the display region 25. In the embodiment, the sealing agent 26 is applied on a step formed by the thin film portion 23 of the planarization film 20.

The liquid crystal layer 70 is arranged in a region defined by the array substrate 110, countersubstrate 120, and sealing agent 26.

Polarizing plates (not shown) are respectively arranged on surfaces of the array substrate 110 and countersubstrate 120 that are opposite to the liquid crystal layer 70.

Next, a method of manufacturing the liquid crystal display apparatus according to the embodiment will be exemplified.

First, a method of forming the array substrate 110 will be explained. Film formation and patterning are repeated on the first transparent insulating substrate for cutting out a plurality of array substrates 110, thereby forming switching elements 14, scanning lines 11, signal lines 12, an insulating film L1, and other switching elements and various interconnections on the array substrate 110.

Then, an exposure resist is applied, exposed, and developed, yielding a planarization film 20 in the form of a transparent organic insulating film. At this time, the exposure resist is applied to the entire display region 25 and frame region. The embodiment employs a photocurable exposure resist. The exposure resist is exposed via an exposure mask and cured into a planarization film 20 of a predetermined pattern having contact holes 21. At the pattern end of the planarization film 20, the exposure resist is exposed via a halftone mask, forming a thin film portion 23 having a small film thickness at the end of the planarization film 20.

Figure 7:
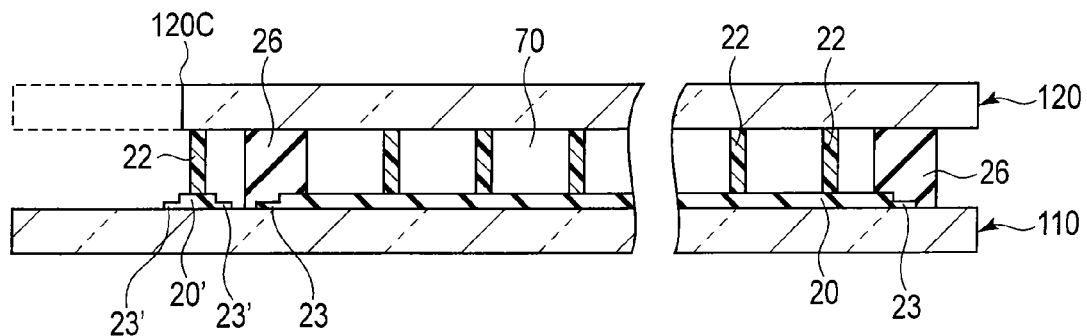
FIG. 7 is a sectional view for explaining an example of a position where the planarization film of the liquid crystal display apparatus according to the embodiment is arranged.

At the same time as the planarization film 20, a second planarization film 20' is formed between the display region 25 and a position where the second planarization film 20' faces the cut portion 120C of the countersubstrate 120, as shown in FIG. 7. As for the second planarization film 20', the exposure resist is exposed via the halftone mask at an end where the second planarization film 20' crosses interconnections arranged on it, forming thin film portions (third thin film portions) 23'.

FIG. 6 is a sectional view for explaining an example of a process of forming the common electrodes 30 above the planarization film 20. A transparent electrode material such as ITO is formed on the planarization film 20, and an exposure resist R is further applied to the transparent electrode material. The exposure resist R is exposed, developed, and patterned into a predetermined pattern of the connection electrodes 31 and common electrodes 30. After the transparent electrode material is patterned by etching, the exposure resist R is removed, forming the common electrodes 30 of the predetermined pattern.

Then, a predetermined electrode pattern is formed a plurality of times by repeating film formation and patterning of aluminum and molybdenum on the common electrodes 30, thereby forming sensor electrodes 40 as multilayered electrodes of aluminum and molybdenum. An exposure resist is applied to the sensor electrodes 40, exposed, and developed, forming an insulating film 50 having contact holes 51. A film of a transparent electrode material such as ITO is formed on the insulating film 50 and patterned into a predetermined pattern having slits 60S, thereby forming pixel electrodes 60. An alignment film having undergone alignment processing such as rubbing processing in a predetermined direction is formed on the surfaces of the pixel electrodes 60.

As described above, forming the thin film portion 23 having a small film thickness at the pattern end of the planarization film 20 decreases a step formed at the pattern end of the planarization film 20. Hence, the exposure resist R can satisfactorily cover the transparent electrode material arranged on the planarization film 20.

Figure 8:
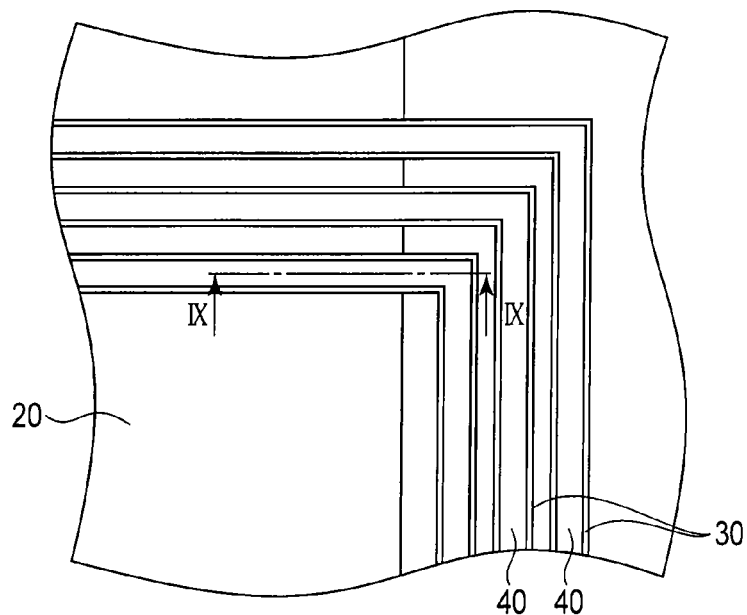
FIG. 8 is a view for explaining an example of an arrangement at the pattern end of a planarization film in a liquid crystal display apparatus of a comparative example.

FIG. 8 is a view for explaining an example of an arrangement at the pattern end of the planarization film 20 when the thin film portion 23 is not arranged.

Figure 9:
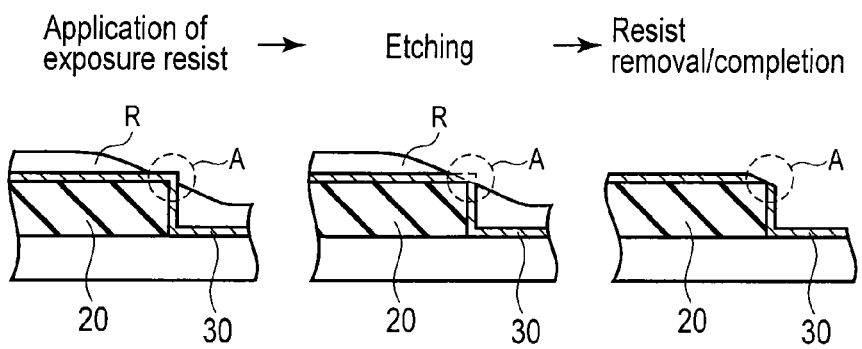
FIG. 9 is a sectional view for explaining an example of a process of forming a conductive layer on a planarization film in the liquid crystal display apparatus of the comparative example.

FIG. 9 is a sectional view for explaining an example of a process of forming a conductive layer on the planarization film 20 when the thin film portion 23 is not arranged. FIG. 9 is a sectional view taken along a line IX-IX in FIG. 8. When the thin film portion 23 is not arranged, at the pattern end of the planarization film 20, as shown in FIG. 8, a 3 μm step is generated at the pattern end of the planarization film 20. In some cases, a portion A may be generated where the exposure resist R does not satisfactorily cover a transparent electrode material which is arranged on the planarization film 20 to cross the pattern end of the planarization film 20, as shown in FIG. 9. If the etching process is performed while the exposure resist R does not satisfactorily cover the transparent electrode material, the etching process may remove the transparent electrode material at the portion A, causing a disconnection or film thinning. Similarly, the sensor electrode 40 may suffer a disconnection or film thinning. Therefore, when the thin film portion 23 is not formed at the pattern end of the planarization film 20, the resistances of the common electrode 30 and sensor electrode 40 may increase.

To the contrary, in the liquid crystal display apparatus of the embodiment, the thin film portion 23 having a small film thickness is arranged at the pattern end of the planarization film 20. At the pattern end, two steps each of about 1.5 μm are formed at a predetermined interval, preventing formation of a large step. The slope of the exposure resist R at the pattern end of the planarization film 20 can be made moderate, and the transparent electrode material is not exposed from the exposure resist R. As a result, a conductive layer arranged on the planarization film 20 to cross the pattern end of the planarization film 20 is not removed in the etching process, avoiding an increase in the resistances of the common electrode 30 and sensor electrode 40.

A step formed by the thin film portion 23 of the planarization film 20 is formed around the display region 25, and serves as the underlayer of the sealing agent 26 (to be described later). For example, when the sealing agent 26 is arranged at the pattern end of the planarization film 20 and the underlayer of the sealing agent 26 includes a portion having a step and a portion having no step, it becomes difficult to adjust the application amount of the sealing agent 26. For example, at a portion where the application amount of the sealing agent 26 is large or small, the sealing agent 26 flows into the display region 25, or the thickness between substrates becomes non-uniform, degrading the display quality. However, the presence of a step formed by the thin film portion 23 on the entire underlayer of the sealing agent 26 allows easily adjusting the application amount of the sealing agent 26. Hence, a high-display-quality liquid crystal display apparatus can be manufactured.

As for the second planarization film 20' interposed between the display region 25 and a position where the second planarization film 20' faces the cut portion 120C of the countersubstrate 120 (to be described later), the thin film portions 23' are formed at an end where the second planarization film 20' crosses a conductive layer formed on it. This can prevent a disconnection or film thinning of the conductive layer arranged on the second planarization film 20', avoiding an increase in the wiring resistance. A high-display-quality liquid crystal display apparatus can be manufactured.

Next, a method of forming the countersubstrate 120 will be explained. A colored exposure resist is repetitively applied, exposed, and developed on the second transparent insulating substrate for cutting out a plurality of countersubstrates 120, forming a first colored layer 24a, second colored layer 24b, third colored layer 24c, fourth colored layer 27a, and fifth colored layer 27b. A transparent resin material serving as the transparent resin planarization film 29 is applied to the plurality of colored layers, and patterned into a predetermined pattern, forming a transparent resin planarization film 29. Then, an alignment film having undergone rubbing processing in a predetermined direction is formed on the surface of the transparent resin planarization film 29.

Columnar spacers 22 are formed by applying, for example, a resin material to the first transparent insulating substrate or second transparent insulating substrate, and patterning it into a predetermined pattern. At this time, columnar spacers 22 are also formed near the cut portion 120C shown in FIG. 7 to face the second planarization film 20'.

Subsequently, a sealing agent 26 in the form of, for example, an ultraviolet-curable resin is applied to the first transparent insulating substrate or second transparent insulating substrate to surround the display region 25. The transparent insulating substrate serving as a plurality of array substrates 110 and the transparent insulating substrate serving as a plurality of countersubstrates 120 are aligned to face each other. The sealing agent 26 is irradiated with ultraviolet rays and cured, fixing the transparent insulating substrates.

A liquid crystal material may be injected into the display region 25 from an injection port formed in the sealing agent 26. Alternatively, before adhering the first and second transparent insulating substrates, a liquid crystal material may be dropped into a region defined by the sealing agent 26. When a liquid crystal material is injected from the injection port, the injection port is sealed with a sealing agent after injection, forming a liquid crystal layer 70. When a liquid crystal material is dropped, the first and second transparent insulating substrates are adhered after dropping, forming a liquid crystal layer 70.

While the first and second transparent insulating substrates are adhered to each other, a plurality of array substrates 110, and portions of the second transparent insulating substrate that face the array substrates 110 are cut out. Further, the second transparent insulating substrate is cut into the countersubstrate 120 at the cut portion 120C shown in FIG. 7.

At this time, the second planarization film 20' and the columnar spacer 22 in contact with the second planarization film 20' are arranged near the cut portion 1200. When cutting the second transparent insulating substrate at the cut portion 120C, the columnar spacer 22 supports the interval between the array substrate 110 and the countersubstrate 120 near the cut portion 1200, preventing a cutting error.

Thereafter, polarizing plates are arranged on surfaces of the array substrate 110 and countersubstrate 120 that are opposite to the liquid crystal layer 70, forming a liquid crystal display apparatus.

As described above, in the liquid crystal display apparatus according to the embodiment, the thin film portion 23 is formed at the pattern end of the planarization film 20. A step which runs onto the planarization film 20 becomes stepwise, improving the coverage of the exposure resist R. This can prevent a disconnection or film thinning in the etching process for a conductive layer which is stacked to overlap the pattern end of the planarization film 20. A liquid crystal display apparatus having low-resistance, high-quality sensor electrodes can be provided.

That is, the embodiment can provide a high-display-quality liquid crystal display apparatus which prevents a disconnection or film thinning to avoid a decrease in touch position detection accuracy.

In the liquid crystal display apparatus according to the embodiment, the film thickness T1 of the planarization film 20 is about 3 μm, but is not limited to this. In a liquid crystal display apparatus using a transverse electric field as described above, the common electrodes 30 and pixel electrodes 60 are arranged on the planarization film 20. In a liquid crystal display apparatus using a longitudinal electric field, pixel electrodes are arranged on a planarization film, and common electrodes are arranged on the other one of paired substrates to face the plurality of pixel electrodes.

When the planarization film 20 does not have a satisfactory thickness, a parasitic capacitance may be generated in the alignment state of the liquid crystal layer 70 or between the conductive layer arranged on the planarization film 20, and the driving interconnections 11 and 12 and switching elements arranged below the planarization film 20. For example, in a liquid crystal display apparatus integrated with a touch sensor, the sensor electrodes 40 may be arranged on the planarization film 20. If a parasitic capacitance is generated between the sensor electrodes 40 and the driving interconnections 11 and 12, it sometimes becomes difficult to accurately detect the touch position. If a large current is supplied to the sensor electrodes 40 so that the touch position can be accurately detected, power consumption increases.

To prevent this, the planarization film 20 may be made thick to suppress the influence of an electric field from the driving interconnections 11 and 12 and the like arranged below the planarization film 20 on upper layers on the planarization film 20. In this case, if a conductive layer and insulating film are arranged on the planarization film to cross the pattern end of the planarization film 20, a portion not satisfactorily covered with the exposure resist is generated due to a step at the pattern end of the planarization film 20. In the etching process, a disconnection or film thinning may occur, increasing the resistance of the conductive layer and degrading the display quality. From this, the film thickness T1 of the planarization film 20 is desirably set to an appropriate value in consideration of power consumption and display quality. To obtain the effects of the embodiment, the film thickness T1 of the planarization film 20 is desirably set to 2 µm or more.

The film thickness T2 of the thin film portion 23 is about 1.5 µm, but is not limited to this. The same effects as those of the embodiment can be obtained as long as the difference between the film thickness T1 of the planarization film 20 and the film thickness T2 of the thin film portion 23 is about 2 µm or less. Hence, the film thickness T2 of the thin film portion 23 suffices to be T1−2 [µm].

In the liquid crystal display apparatus according to the embodiment, the thin film portion 23 forms two steps (two steps each of about 1.5 µm) at the pattern end of the planarization film 20, but the steps are not limited to them. Three or more steps can also be formed by arranging a plurality of thin film portions so that the pattern end of the planarization film 20 thins stepwise. For example, three steps each of about 1 µm may be formed by arranging a thin film portion having a film thickness of about 2 µm and a second thin film portion having a film thickness of about 1 µm at the pattern end of the planarization film 20 having a film thickness of about 3 µm so that the film thickness of the pattern end thins stepwise. Even when a plurality of thin film portions are formed, the film thickness difference between adjacent layers which form a step is desirably set to 2 µm or less.

The liquid crystal display apparatus according to the embodiment adopts the array substrate 110 using the planarization film 20, but is not limited to this. In a liquid crystal display apparatus including a color filter ON array substrate (COA substrate), when a plurality of colored layers (R, G, and B layers) arranged in the display region, and interconnections which are arranged in the frame region and cross the ends of the colored layers are arranged above, a step may be formed by arranging a small-thickness portion at the pattern end of the colored layer arranged outermost. Even in this case, the same effects as those of the liquid crystal display apparatus according to the above-described embodiment can be obtained.

The embodiment has described a liquid crystal display apparatus in the FFS mode, but the present invention is also applicable to a liquid crystal display apparatus other than that in the FFS mode. The same effects as those of the above-described embodiment can be obtained by arranging a thin film portion at the pattern end of a planarization film as long as the liquid crystal display apparatus includes a planarization film, and a conductive layer arranged on it to cross the pattern end of the planarization film. Needless to say, the present invention is applicable not only to a liquid crystal display apparatus using a transverse electric field but also to a liquid crystal display apparatus using a longitudinal electric field.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display apparatus comprising:
    a display region including a plurality of display pixels arrayed in a matrix;
    an array substrate including pixel driving interconnections configured to drive the plurality of display pixels;
    a planarization film which is arranged on the pixel driving interconnections and includes a thin film portion having a small film thickness at a pattern end, wherein the thin film portion is extended along the display region so as to surround the display region;
    first electrodes which are arranged on the planarization film to cross the pattern end of the planarization film;
    a countersubstrate which is arranged to face the array substrate; and
    a liquid crystal layer which is interposed between the array substrate and the countersubstrate.

2. The apparatus according to claim 1, further comprising a sealing agent which is interposed between the array substrate and the countersubstrate to surround the display region, wherein the thin film portion is arranged around the display region and serves as an underlayer of the sealing agent.

3. The apparatus according to claim 1, wherein the planarization film and the thin film portion have a film thickness difference of not larger than 2 µm.

4. The apparatus according to claim 2, wherein the planarization film and the thin film portion have a film thickness difference of not larger than 2 µm.

5. The apparatus according to claim 1, wherein
    the planarization film further includes a second thin film portion smaller in film thickness than the thin film portion, and
    the thin film portion and the second thin film portion are arranged to decrease the film thickness stepwise at the pattern end of the planarization film.

6. The apparatus according to claim 2, wherein
    the planarization film further includes a second thin film portion smaller in film thickness than the thin film portion, and
    the thin film portion and the second thin film portion are arranged to decrease the film thickness stepwise at the pattern end of the planarization film.

7. The apparatus according to claim 3, wherein
    the planarization film further includes a second thin film portion smaller in film thickness than the thin film portion, and
    the thin film portion and the second thin film portion are arranged to decrease the film thickness stepwise at the pattern end of the planarization film.

8. The apparatus according to claim 1, wherein
    the planarization film further includes a second planarization film which is interposed between a position where the second planarization film faces a cut portion of the countersubstrate, and the display region, and
    the second planarization film includes a third thin film portion having a small film thickness at the pattern end.

9. The apparatus according to claim 2, wherein
    the planarization film further includes a second planarization film which is interposed between a position where the second planarization film faces a cut portion of the countersubstrate, and the display region, and
    the second planarization film includes a third thin film portion having a small film thickness at the pattern end.

10. The apparatus according to claim 3, wherein
    the planarization film further includes a second planarization film which is interposed between a position where the second planarization film faces a cut portion of the countersubstrate, and the display region, and the second planarization film includes a third thin film portion having a small film thickness at the pattern end.

11. The apparatus according to claim 4, wherein the planarization film further includes a second planarization film which is interposed between a position where the second planarization film faces a cut portion of the countersubstrate, and the display region, and the second planarization film includes a third thin film portion having a small film thickness at the pattern end.

12. The apparatus according to claim 1, further comprising:

second electrodes which are arrayed in a matrix on the first electrodes; and third electrodes which are arranged on an insulating layer above the second electrodes to face the first electrodes, wherein the third electrodes include a plurality of slits extending substantially parallel to each other.

13. The apparatus according to claim 2, further comprising:

second electrodes which are arrayed in a matrix on the first electrodes; and third electrodes which are arranged on an insulating layer above the second electrodes to face the first electrodes, wherein the third electrodes include a plurality of slits extending substantially parallel to each other.

14. The apparatus according to claim 3, further comprising:

second electrodes which are arrayed in a matrix on the first electrodes; and third electrodes which are arranged on an insulating layer above the second electrodes to face the first electrodes, wherein the third electrodes include a plurality of slits extending substantially parallel to each other.

15. The apparatus according to claim 4, further comprising:

second electrodes which are arrayed in a matrix on the first electrodes; and third electrodes which are arranged on an insulating layer above the second electrodes to face the first electrodes, wherein the third electrodes include a plurality of slits extending substantially parallel to each other.

16. The apparatus according to claim 5, further comprising:

second electrodes which are arrayed in a matrix on the first electrodes; and third electrodes which are arranged on an insulating layer on the second electrodes to face the first electrodes, wherein the third electrodes include a plurality of slits extending substantially parallel to each other.

17. A liquid crystal display apparatus comprising:

a display region including a plurality of display pixels arrayed in a matrix;

an array substrate including an underlayer expanded on the display region and a peripheral region around the display region and having first and second thicknesses in the display region and the peripheral region, respectively, and first electrodes which are arranged on the underlayer in the display region, wherein the first thickness of the underlayer in the display region is larger than the second thickness of the underlayer in the peripheral region;

a countersubstrate which is arranged to face the array substrate; and a liquid crystal layer which is interposed between the array substrate and the countersubstrate.

18. The apparatus according to claim 17, wherein the array substrate further includes an inorganic insulating film which is arranged on the first electrodes, and an organic insulating film which is arranged below the first electrodes and has a first film thickness in the display region and a second film thickness at a pattern end, the first film thickness being larger than the second film thickness.

19. The apparatus according to claim 18, wherein the first film thickness and the second film thickness have a difference of not larger than 2 μm.

20. A liquid crystal display apparatus comprising:

an array substrate including an organic insulating film including a thin film portion having a small film thickness at a pattern end, a conductive oxide film which is arranged on the organic insulating film across the pattern end, wherein the thin film portion is extended along a display region so as to surround the display region, and an inorganic insulating film which is arranged on the conductive oxide film;

a countersubstrate which is arranged to face the array substrate; and a liquid crystal layer which is interposed between the array substrate and the countersubstrate.

21. The apparatus according to claim 20, wherein the array substrate further includes sensor electrodes which are arrayed in a matrix on the conductive oxide film.

22. The apparatus according to claim 21, wherein the sensor electrode is a multilayered electrode of aluminum and molybdenum.

* * * * *